United States Patent [19]
Li et al.

[11] Patent Number: 5,624,769
[45] Date of Patent: Apr. 29, 1997

[54] CORROSION RESISTANT PEM FUEL CELL

[75] Inventors: Yang Li, Troy; Wen-Jin Meng, Okemos; Swathy Swathirajan, West Bloomfield; Stephen J. Harris, Bloomfield; Gary L. Doll, Orion Township, Oakland County, all of Mich.

[73] Assignee: General Motors Corporation, Detroit, Mich.

[21] Appl. No.: 577,397

[22] Filed: Dec. 22, 1995

[51] Int. Cl.$^6$ .................................................. H01M 8/10
[52] U.S. Cl. ................................................ 429/32; 429/33
[58] Field of Search ............... 429/32, 33; 204/192.17; H01M 8/10

[56] References Cited

U.S. PATENT DOCUMENTS

| | | | |
|---|---|---|---|
| 3,134,697 | 5/1964 | Niedrach . | |
| 5,272,017 | 12/1993 | Swathirajan et al. | 429/33 |
| 5,328,779 | 7/1994 | Tannenberger et al. | 429/32 |
| 5,427,666 | 6/1995 | Mueller et al. | 204/192.17 |

OTHER PUBLICATIONS

Massiani et al, "Study of the Behaviour in Acidic Solution of Titanium and TiN Coatings Obtained by Cathodic Sputtering," Surf. Coat. Technol., 33 (1987) 309–317 (month unknown).

Narayan et al, "Epitaxial Growth of TiN Films on (100) Silicon Substrates by Laser Physical Vapor Deposition," Appl. Phys. Lett. 61 (11) (1992) 1290–1292 (month unknown).

Johansson et al, "Growth and Properties of Single Crystal TiN Films Deposited by Reactive Magnetron Sputtering," J. Vac. Sci. Technol. A 3 (1985) 303–307 (Mar.–Apr.).

Hubler et al, "The Dependence of Hardness and Corrosion Protection Power of Ion–Beam–Assisted Deposition TiN Coatings on the Ion Beam Impact Angle," Surf. Coat. Technol., 60 (1993) 549–555 (month unknown).

In et al, "Corrosion Behaviour of TiN Films Obtained by Plasma–Assisted Chemical Vapour Deposition," J. Mater. Sci., 29 (1994) 1818–1824 (month unknown).

Ernsberger et al, Vac. Sci. Technol. A 4(6) (1986) 2784 (Nov.–Dec.).

Tavi et al, "Corrosion Testing of ZrN and TiN Films," Mater. Sci. Forum, 44–45 (1989) 15–27 (month unknown).

Erdemir et al, "A Study of the Corrosion Behavior of TiN Films," Mater. Sci. Eng. 69 (1985) 89–93 (month unknown).

Thornton et al, "The Microstructure of Sputter–Deposited Coatings," Vac. Sci. Technol., A 4 (1986) 3059–3065 (Nov.–Dec.).

Lardon et al, "Morphology of Ion–Plated Titanium and Aluminum Films Deposited at Various Substrate Temperatures," Thin Solid Films, 54 (1978) 317–323 (month unknown).

Telama et al, "A Study of Defects in Sputtered TiN Coatings by Electrochemical Polarization," Vac. Sci. Technol., A 4 (1986) 2911–2914 (Nov.–Dec.).

Jehn et al, "Corrosion Studies with Hard Coating–Substrate Systems," Surf. Coat. Technol., 54/55 (1992) 108–114 (month unknown).

Freller et al, "Electrochemically Measured Porosity of Magnetron Sputtered TiN Films Deposited at Various Substrate Orientations," Vac. Sci. Technol., A 4 (1986) 2691–2694 (Nov.–Dec.).

*Primary Examiner*—Stephen Kalafut
*Attorney, Agent, or Firm*—Lawrence B. Plant

[57] ABSTRACT

The present invention contemplates a PEM fuel cell having electrical contact elements (including bipolar plates/septums) comprising a titanium nitride coated light weight metal (e.g., Al or Ti) core, having a passivating, protective metal layer intermediate the core and the titanium nitride. The protective layer forms a barrier to further oxidation/corrosion when exposed to the fuel cell's operating environment. Stainless steels rich in CR, Ni, and Mo are particularly effective protective interlayers.

8 Claims, 3 Drawing Sheets

CORROSION RESISTANT PEM FUEL CELL

The Government of the United States of America has rights in this invention pursuant to contract No. DE-AC02-90CH10435 awarded by the United States Department of Energy.

This invention relates to PEM fuel cells and more particularly to corrosion-resistant electrical contact elements therefor.

BACKGROUND OF THE INVENTION

Fuel cells have been proposed as a power source for electric vehicles. One such fuel cell is the PEM (i.e., Proton Exchange Membrane) fuel cell as it has potentially high energy and low weight, both of which are highly desirable for mobile electric vehicles. PEM fuel cells are well known in the art, and include a so-called "membrane-electrode-assembly" comprising a thin, solid polymer membrane-electrolyte having an anode on one face of the membrane-electrolyte and a cathode on the opposite face of the membrane-electrolyte. The membrane-electrode-assembly is sandwiched between a pair of electrically conductive elements which serve as current collectors for the anode/cathode and often contain appropriate channels and openings therein for distributing the fuel cell's gaseous reactants (e.g., $H_2$ & $O_2$/air) over the surfaces of the respective anode and cathode. The anode and cathode themselves typically comprise finely divided carbon particles, very finely divided catalytic particles supported on the internal and external surfaces of the carbon particles, and proton conductive material intermingled with the catalytic and carbon particles. One such membrane-electrode-assembly and fuel cell is described in U.S. Pat. No. 5,272,017 issued Dec. 21, 1993 and assigned to the assignee of the present invention.

It is also known to construct bipolar PEM fuel cells wherein a plurality of the membrane-electrode-assemblies are stacked together in electrical series while being separated one from the next by an impermeable, electrically conductive contact element often referred to as a bipolar plate or septum. The bipolar septum/plate electrically conducts current between the anode of one cell to the cathode of the next adjacent cell in the stack.

In an $H_2$-air PEM fuel cell environment, the bipolar plates are in constant contact with highly acidic solutions (pH 3.5) containing $F^-$, $SO_4^{--}$, $SO_3^-$, $HSO_4^-$, $CO_3^{--}$, and $HCO_3^-$, etc. Moreover, the cathode ms polarized to a maximum of about +1 V vs. the normal hydrogen electrode and exposed to pressurized air, and the anode is exposed to pressurized hydrogen or methanol reformat. Hence, metal contact elements (including bipolar plates/septums) are subject to anodic dissolution at the cathode, and hydrogen embrittlement at the anode. Accordingly, contact elements are often fabricated from graphite which is light-weight, corrosion-resistant, and electrically conductive in the PEM fuel cell environment. However, graphite is quite fragile which makes it difficult to mechanically handle and process contact elements made therefrom. Moreover graphite is, quite porous making it virtually impossible to make very thin gas impervious plates. The pores in graphite often lead to gas permeation under the fuel cell's operating pressure which could lead to the undesirable mixing of $H_2$ and $O_2$. Finally, the electrical and thermal conductivity of graphite is quite low compared with light weight metals such as aluminum and titanium and their alloys. Unfortunately, such light weight metals are either not corrosion resistant in the PEM fuel cell environment, and contact elements made therefrom deteriorate rapidly, or they form highly electronically resistive oxide films on their surface that increases the internal resistance of the fuel cell and reduces its performance.

SUMMARY OF THE INVENTION

The present invention contemplates a PEM fuel cell having electrical contact elements (including bipolar plates/septums) comprising a titanium nitride coated light weight metal (e.g., Al or Ti) core, having a protective metal layer intermediate the core and the titanium nitride. The protective layer is susceptible to oxidation in the operating environment of the fuel cell so as to form an barrier to further corrosion at sites where the layer is exposed to such environment. Oxides formed on the protective metal layer have relatively low electrical resistivity so as not to substantially increase the internal resistance of the fuel cell. A particularly effective such protective layer comprises stainless steels rich in chromium, nickel and molybdenum (hereinafter Cr/Ni/Mo-rich). By Cr/Ni/Mo-rich stainless steel means a stainless steel containing at least about 16% by weight Cr., at least about 20% by weight Ni, and at least 3% by weight Mo. Another material potentially useful as a protective interlayer between the core and the titanium nitride topcoat is a nickel-phosphorus alloy formed by electroless chemical deposition from nickel hypophosphite solutions uing techniques well known to those skilled in the art.

DETAILED DESCRIPTION OF THE INVENTION

The invention will be better understood when considered in the light of the following detailed description thereof which is given hereafter in conjunction with the following drawings of which:

BRIEF DESCRIPTION OF THE DRAWINGS

FIG. 1 depicts a two cell, bipolar PEM fuel cell having a pair of membrane-electrode-assemblies 4 and 6 separated from each other by electrically conductive bipolar septum/plate 8. The membrane-electrode assemblies 4 and 6, and bipolar septum/plate 8, are stacked together between stainless steel clamps 10 and 12 and end contact elements 14 and 16. The end contact elements 14 and 16 as well as the bipolar septum/plate 8, contain a plurality of channels and openings 18, 20, 22, and 24 for distributing reaction gases (i.e., $H_2$ & $O_2$) to the membrane-electrode assemblies 4 and 6. Nonconductive gaskets 26, 28, 30, and 32 provide seals and electrical insulation between the several components of the fuel cell. Gas permeable carbon cloth current collectors 34 and 36 press up against the anode sides of the membrane electrode assembly (not shown) and the cathode sides 42 and 44. The anode and cathode sides of the membrane-electrode assembly are separated from each other by a solid polymer membrane-electrolyte (SPE) 43 and 45. Such membranes are well known in the art and are described in U.S. Pat. Nos. 5,272,017 and 3,134,697, and in Journal of Power Sources, Volume 29 (1990) pages 367–387. In general, such membranes are made from ion exchange resins, and typically comprise a perflourinated sulfonic acid polymer such as NAFION available from the E.I. DuPont de Nemours & Co. The end contact elements 14 and 16 press up against the carbon sheets 34 and 40 respectively, while the bipolar septum/plate 8 presses up against the carbon cloth 36 on one face (i.e., the cathode face) thereof, and against carbon cloth 38 on the opposite face (i.e., the anode face). Oxygen is supplied to the cathode side of the fuel cell from storage tank 46, while hydrogen is supplied to the anode side of the fuel cell from storage tank or reformer 48.

Figures 1, 2:
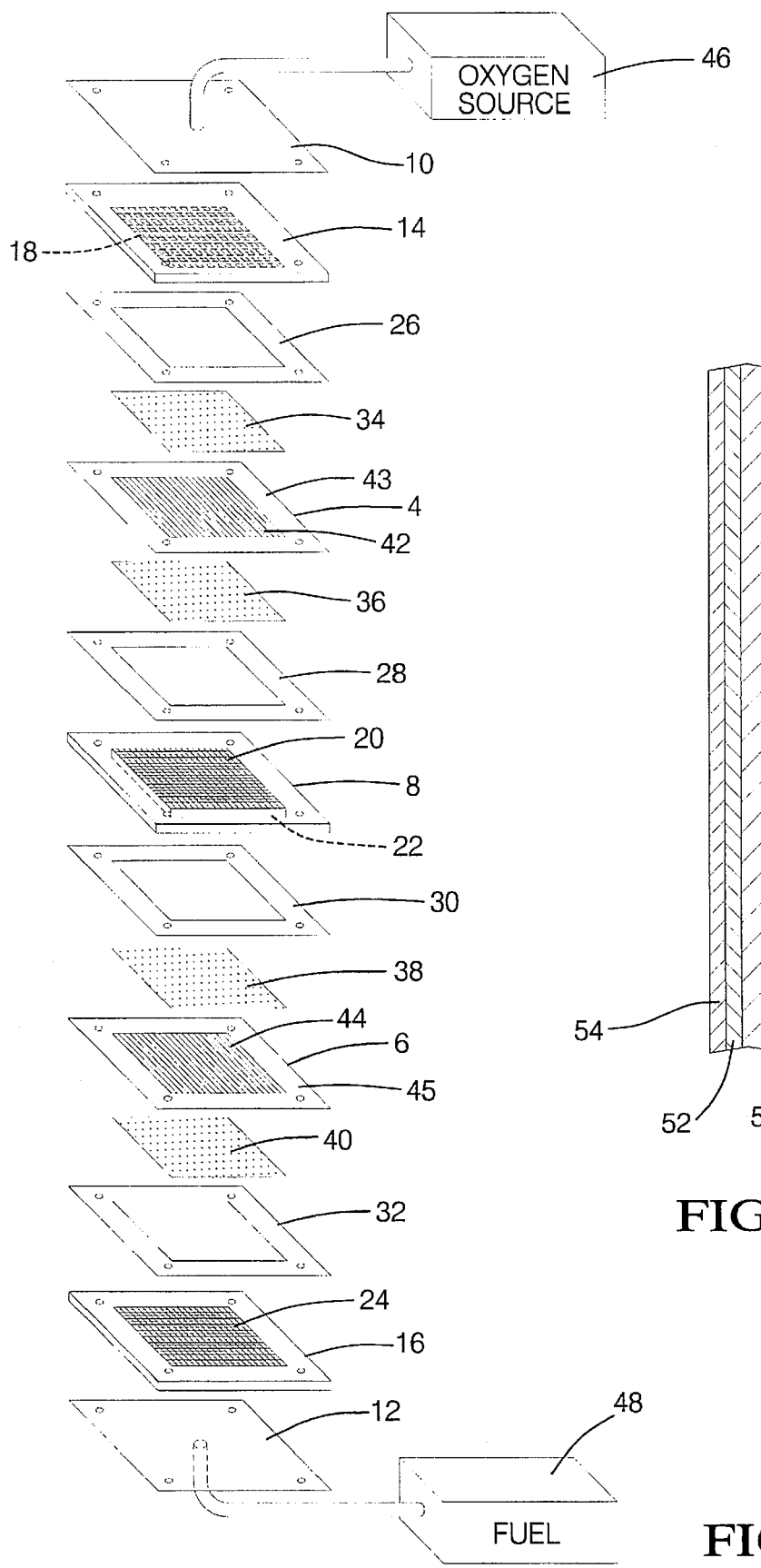
FIG. 1 is a schematic, isometric, exploded view of a bipolar PEM fuel cell.
FIG. 2 is sectioned view through the bipolar plate of FIG. 1.

In accordance with the present invention and as best shown in FIG. 2, at least one of the bipolar septum/plate 8 or the end contact elements 14 and 16 will comprise a core 50 of a light weight metal such as aluminum or titanium. When used herein the terms "aluminum" and "titanium" are intended to include not only the pure metals but their respective alloys. A barrier/protective layer 52 of a metal which forms a low resistance, passivating oxide film is deposited onto the core 50, and is covered with a topcoat of titanium nitride 54. Stainless steels rich in chromium (ie at least 16% by weight), nickel (i.e. at least 20% by weight), and molybdenum (i.e at least 3% by weight) have been found to be excellent such barrier/protective layers 52 as they form a dense oxide layer which inhibits further corrosion, but which does not significantly increase the fuel cell's internal resistance. A particularly effective such stainless steel for this purpose is commercially available from the Rolled Alloy Company as alloy AL-6XN, and contains 23±2% by weight chromium, 21±2% by weight nickel, and 6±2% by weight molybdenum. Alternatively, electrolessly deposited nickel-phosphorous alloys appear to have good potential as a substitute for the stainless steel in that they readily form a passivating film when exposed to the fuel cell environment which provides a barrier to further oxidation/corrosion of the underlying coating. Titanium nitride is both corrosion resistant, highly electrically conductive (i.e., bulk resistivity=15–20 $\mu\Omega$·cm), and does not lose significant conductivity as a result of oxidation. However, TiN is difficult to deposit in a perfectly continuous layer, and microdiscontinuities/submicron-defects in the TiN coating expose the underlying metal to the corrosive environment of the fuel cell. Were the immediately underlying metal to be aluminum or titanium, it would rapidly corrode, or form an insulating oxide film at, the sites of the discontinuities. Cr/Ni/Mo/-rich stainless steels, on the other hand, are much more corrosion resistant than aluminum owing to their ability to passivate against further corrosion by growing a protective oxide barrier at the sites of the discontinuities, and accordingly provide an excellent protective barrier for the aluminum.

The barrier/protective stainless steel layer, and the TiN topcoat are preferably deposited onto the light weight metal core using conventional physical vapor deposition (PVD) techniques (e.g., magnetron sputtering), or chemical vapor deposition (CVD) techniques known to those skilled in these arts. Strong, pinhole-free, stainless steel layers 10 µm thick can be PVD deposited without difficulty, and have proved to be effective protective layers. Stainless steel layers deposited at greater PVD substrate biases (i.e. greater than about 270 V) have been found to be more corrosion resistant than those provided at lower such biases. TiN layers deposited at greater PVD substrate biases (i.e. greater than about 60 V) have been found to be better than those deposited at lowere biases.

TESTING

COATING AND CHARACTERIZATION OF THE FILMS—Test samples were made, at room temperature, from ⅝ inch diameter aluminum (3000 series) disk substrates in a laboratory scale sputter deposition machine. The first coating/layer was Al-6XN stainless steel. The sputtering system was equipped with two magnetron sputtering guns, and a biasable rotating substrate holder. The base pressure was about $1\times10^{-6}$ torr. The pressure of the argon carrier gas was 4 to 6 mTorr, and the power was about 0.6 kW for each gun. The stainless steel was deposited at a rate of about 15 to 18 angstroms/sec for a total film thickness of about 10 µm, according to an XTC thin film thickness monitor. Three different substrate bias levels, i.e., 0 V, –130 V, and –270 V were applied to the substrates to examine the effect of bias on corrosion behavior. The TiN topcoat was produced by reactive sputtering of Ti in an Ar/N$_2$ mixture. The TiN deposition rate was about 2 angstroms per second (A°/sec) with a bias of 120 V for a total TiN thickness of about 3000 angstroms. Stainless steel and TiN thin films were also deposited onto Si substrates at different bias levels for the purpose of characterizing the films. Additional samples were made with TiN films deposited directly atop the aluminum (i.e., sans stainless steel) with an industrial scale sputter coating machine at about 350° C. to explore the effects of multi-directional fluxes on the properties of the coatings. All of the stainless steel and TiN coatings were examined by $\theta$–$2\theta$ X-Ray diffraction using a Siemens D500 $\theta$—74 diffractometer with CuK$_\alpha$ radiation to determine their structures. The coating compositions were quantitatively measured by electron probe microanalysis. Samples were examined by x-ray photoelectron spectroscopy (XPS) depth profile after the corrosion test to determine if the coating composition was uniform.

The stainless steel coatings deposited at different biases consist mainly of Fe, Cr, Ni, and Mo, shown in Table I, as measured by EPMA.

TABLE I

| Bias (V) | Fe | Cr | Ni | Mo | Mn | Cu | Si |
| --- | --- | --- | --- | --- | --- | --- | --- |
| 0 | 48.4 | 23.2 | 21.9 | 5.6 | 0.1 | 0.1 | 0.2 |
| 130 | 48.5 | 23.5 | 21.2 | 5.8 | 0.1 | 0.1 | 0.3 |
| 270 | 47.9 | 23.7 | 20.1 | 6.6 | <0.1 | <0.1 | 0.2 |

The X-ray diffraction (XRD) spectra of these stainless steel films indicate that the coatings comprise a mixture of bcc ($\alpha$) and fcc ($\gamma$) solid solutions. The d-spacing corresponding to $\gamma(111)$, $\alpha(110)$ and $\gamma(200)$ peaks were obtained by fitting them with Lorentzians and are given in Table II.

TABLE II

| Bias (V) | $\gamma(111)$ (Angstroms) | $\alpha(110)$ (Angstroms) | $\gamma(200)$ (Angstroms) |
| --- | --- | --- | --- |
| 0 | 2.0797 | 2.0412 | 1.8155 |
| 130 | 2.0847 | 2.0450 | 1.8197 |
| 270 | 2.0902 | 2.0513 | 1.8338 |

This data indicates that higher substrate bias during deposition increases the d-spacing of all peaks, which indicates an increasing compressive stress in the coating.

Although the bulk composition and the fraction of α and γ phases in the coatings are almost identical based on EPMA an XRD, coatings made at different biases show significant differences in their surface oxide layers after the corrosion test. This suggests that the compressive stress induced into the stainless steel layer during deposition may have a significant effect on oxidation behavior.

It is known in general that the morphology and structure of sputter-deposited coatings are dependent on deposition conditions such as substrate temperature, gas pressure, and bias of the substrate, and have a direct impact on their corrosion behavior. Hence, the effect of substrate bias on TiN films deposited at room temperature was investigated. The structure of TiN deposited on Si (100) had preferred (100) orientation when the plasma potential was 60 V more than that of the substrate. At zero bias, the predominant orientation was (111). Moreover, by visual inspection, the TiN film was dark brown in color when the bias was below 60 V, and was gold-like for higher biases. Furthermore, the electrical resistance of the dark-colored film is significantly higher than the light-colored TiN film. Hence, it is preferred that the substrate bias be higher than 60 V when depositing corrosion resistant TiN films for fuel cell applications. The TiN films were also examined under an optical microscope. Submicrometer defects were observed in all samples made by both the laboratory coating system and industrial scale sputtering machine.

Figure 3:
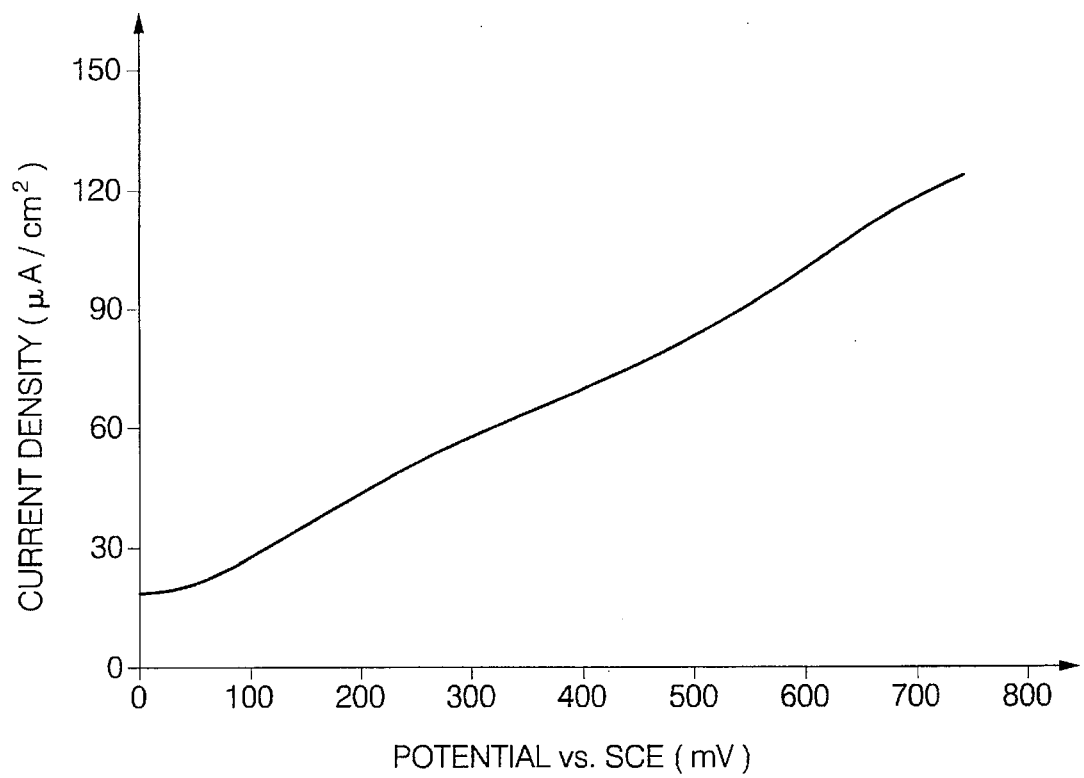
FIG. 3 is a potentiodynamic polarization curve of a bare aluminum 6061-T6 in a simulated fuel cell environment.

CORROSION TESTS—Corrosion tests were conducted in an electrolyte containing $10^{-4}$M $H_2SO_4$ and about 2 ppm HF at 90° C. (open to air) to simulate the PEM fuel cell environment. Samples (1.2 cm$^2$ area) were examined by potentiodynamic polarization (PDP), and constant anodic polarization of an IBM/AT EG&G-controlled PAR model 273 potentiostat. A saturated calomel electrode (SCE) and a graphite rod were used as reference and counter electrodes respectively. The voltage scan rate was 1 mV/sec in the PDP test. In addition, two TiN coated aluminum end plates were tested in an actual fuel cell test. To establish a base line for the corrosion behavior of coatings, a bare Al sample was first tested in the simulated fuel cell environment. A current density-voltage curve of a bare aluminum 6061-T6 sample tested in the corrosion test cell is shown in FIG. 3. Severe pitting on the surface was observed by visual inspection about one minute after the sample was polarized at +760 mV vs. SCE. A similar phenomenon was also observed on TiN (ca. 2 μm thick) coated aluminum where pits initiated from defect areas of the TiN films about one (1) minute after the anodic voltage was applied. In addition, two TiN coated aluminum end contact elements were tested during actual fuel cell operation in order to compare the corrosion behavior of the coatings in the simulated environment with that in the actual fuel cell environment. The performance of the $H_2$—$O_2$ fuel cell at 90° C., 30 psig back pressure, improved for the first five hours due to activation of the membrane-electrode-assembly, and then maintained a current density of 1 A/cm$^2$ at about 0.5 volts for at least five hours. Thereafter, the current density began to decrease when the voltage between the anode and the cathode was fixed at 0.5 V. After a total of 22 hours of operation, the current density decreased to about 0.5 A/cm$^2$ at the same voltage. Upon disassembly of the fuel cell, the TiN-coated aluminum end contact elements were examined under an optical microscope which revealed that pits had developed on some of the defect areas especially on the cathode side of the fuel cell. The area density of the pits was only about 25% of the area density of the pits developed after one minute in the simulated corrosion test cell, and verified that the constant anodic polarization testing in the simulated fuel cell test is an effective accelerated test for corrosion likely to occur in actual fuel cell operation.

Figure 4:
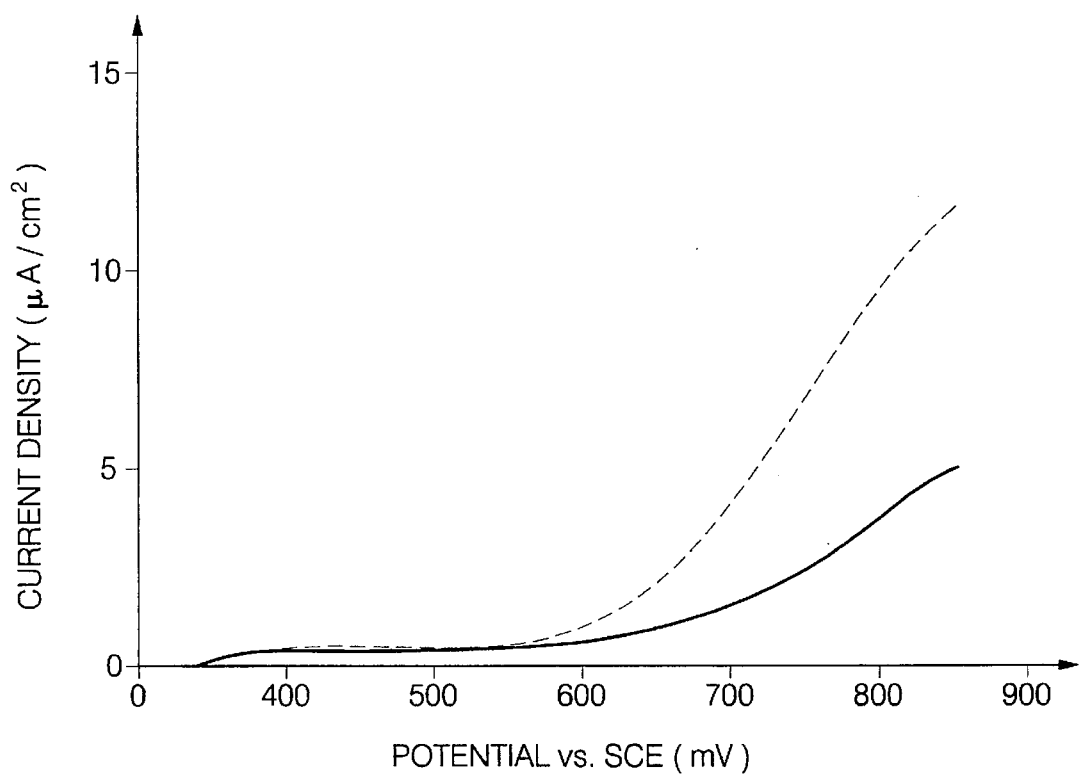
FIG. 4 are typical potentiodynamic polarization curves for aluminum coated with (a) just stainless steel, and (2) both stainless steel and TiN in a simulated fuel cell environment.
Figure 5:
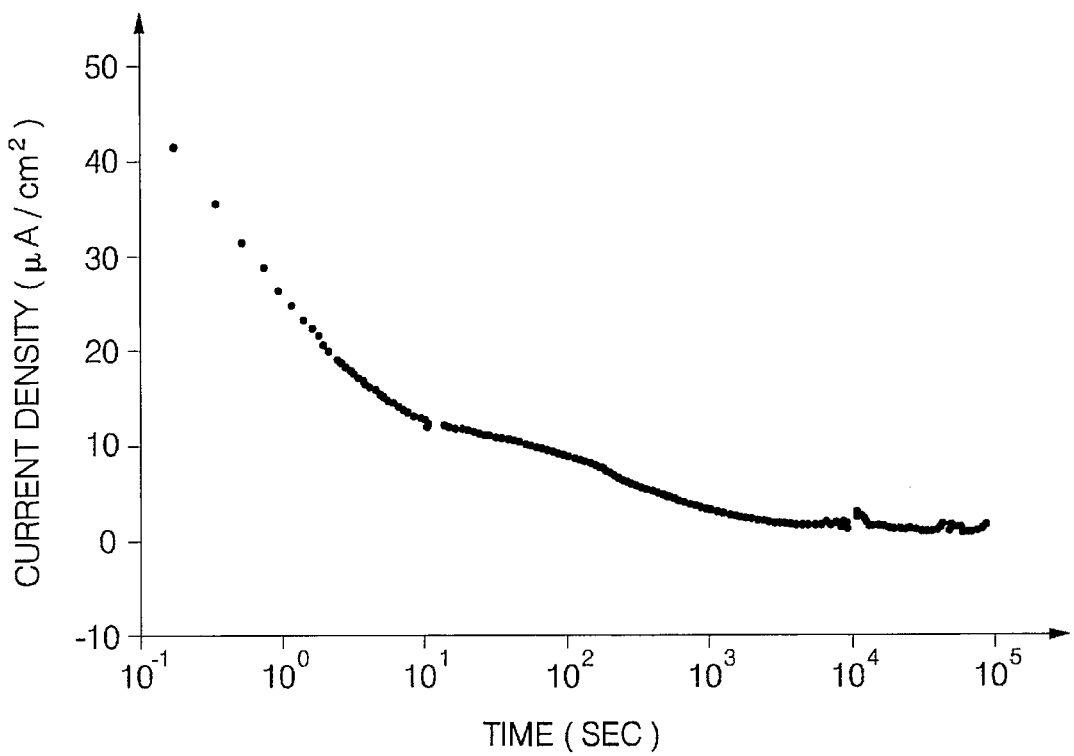
FIG. 5 is a current vs. time plot of a TiN/SS-coated aluminum substrate at a constant anodic polarization of 760 mV vs. SCE.

The potentiodynamic polarization curve shown in FIG. 4 is representative of stainless steel-coated aluminum samples at different deposition biases. Also shown in FIG. 4 is a curve of a TiN/stainless-coated aluminum sample. In all cases, potentiodynamic polarization current density is less than 10 μA/cm$^2$ at 760 mV vs. SCE. This voltage corresponds to the potential of the fuel cell cathode under open circuit condition, at which potential, the electrode experiences the highest anodic polarization. Moreover, when the electrode was held at a constant anodic polarization of 760 mV, the coatings passivate, as shown in FIG. 5, and the steady-state anodic dissolution current density was less than 0.5+/−0.5 μA/cm$^2$. Therefore the stainless steel coatings underwent passivation under polarization, and no defects, such as pinholes, were present in the coatings. Moreover, no galvanic action occurred at the defect areas in the TiN topcoat. In contrast, stainless steel coatings having compositions close to 304 and 316 L (i.e. Cr/Ni/Mo-lean) showed pitting when subjected to the above test and the anodic current density was larger than 80 μA/cm$^2$.

Finally depending on the deposition conditions, the surface oxide layers on the stainless steel coating showed significant differences, although the bulk composition and structure did not. The surface color of the coatings which were deposited with lower biases became brown and dark blue after the corrosion test, whereas coatings deposited with a bias of 270 V showed negligible color change when compared to the as-deposited films. Post-corrosion XPS depth profiles of the stainless steel coatings indicate that the surface oxidation layer is two (2) to nine (9) times thicker for the coatings fabricated at low bias (i.e., 130 V and 0 V) than that for the ones deposited at high bias (i.e., 270 V). Moreover, whereas the surface oxide layer for the low biased coatings contains iron oxide, the oxide on the high biased coating has more Cr and Ni oxides. These results suggest that the higher compressive stresses induced into the coatings deposited at higher biasing voltages have a beneficial effect on surface oxidation.

Figure 6:
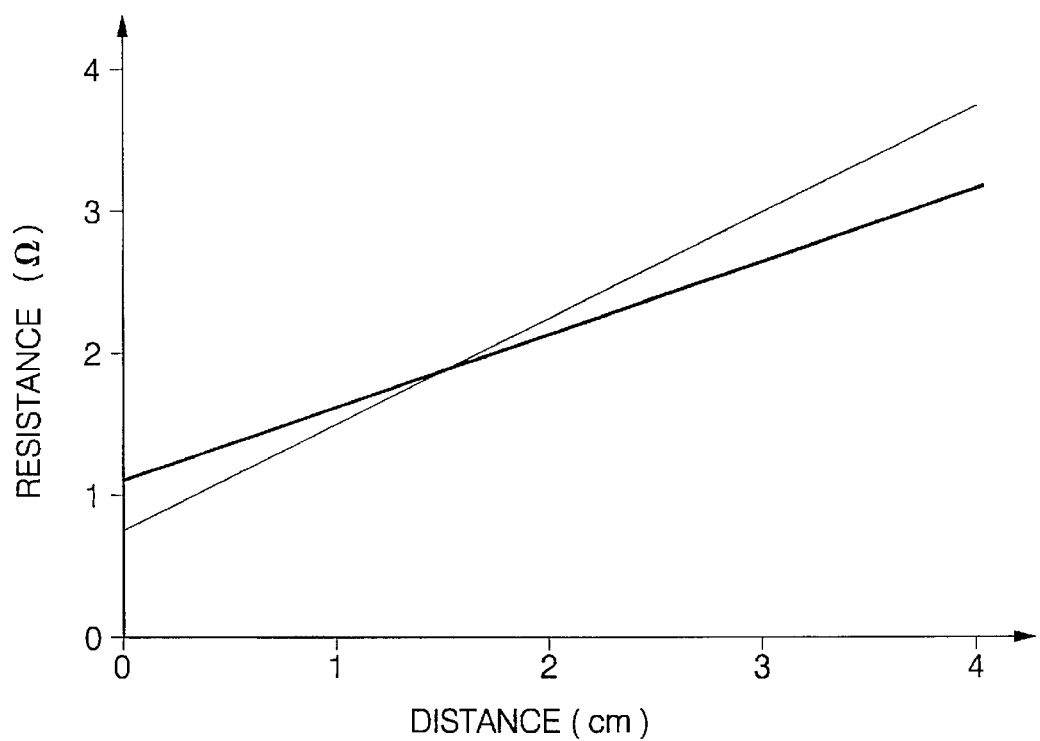
FIG. 6 is a measured resistance plot for different lengths of "as-deposited" and "post corrosion testing" of a TiN film.

CONTACT RESISTANCE—It is known that TiN can be oxidized to form a $Ti(N_xO_y)$ layer, and the resistance of this oxide layer depends on the film's thickness and oxygen content. Hence, it is important to measure the contact resistance after completion of the corrosion tests. TiN thin films (ca. 3000 angstroms thick) were subjected to contact resistance measurements before and after corrosion tests. Four narrow silver strips (1 mm wide) were painted onto a TiN coated Si(100) substrate with different distances between each pair of silver paint strips. A constant current (10 mA) was applied through each pair of silver paint terminals while the voltage difference was measured by a digital multimeter at the same terminals. Resistance was calculated from the measured voltage and the constant current. Contact resistance was then extrapolated to zero from the plot of the resistance versus the length between the two terminals. The resistance, R, versus the distance between silver paint strips, L, of "as deposited" and "post-corrosion test" samples are plotted in FIG. 6. The extrapolated contact resistance for these two samples is about 1.1 and 0.8 Ω respectively. The specific contact resistance is estimated to be 0.05 Ωcm$^2$ for both cases based on the contact area of 0.045 and 0.06 cm$^2$, respectively Hence within the limits of experimental error, it would seem that the contact resistance did not change appreciably before and after the corrosion test. Also, XPS depth profile indicated that the thickness of the Ti(N$_x$O$_y$) layer is about the same for the as-deposited coating and the one corrosion tested for more than five (5) days.

While the invention has been disclosed primarily in terms of a specific embodiment thereof it is not intended to be limited thereto, but rather only to the extent set orth hereafter in the claims which follow.

What is claimed is:

1. In a PEM fuel cell having at least one cell comprising a pair of opposite polarity electrodes, a membrane electrolyte interjacent said electrodes for conducting ions therebetween, and an electrically conductive contact element engaging at least one of said electrodes for conducting electrical current from the electrode it engages, the improvement comprising said contact element comprising a metal core selected from the group consisting of aluminum and titanium, a protective coating on said core, and a microdiscontinuous titanium nitride topcoat atop said protective coating, said titanium nitride topcoat having a plurality of defects therein exposing said protective coating to a corrosive operating environment within said fuel cell, said protective coating being susceptible to oxidative passivation by said corrosive operating environment so as to form a barrier to further corrosion on the portions of said coating exposed to said environment, whereby said core is protected from corroding by said protective coating underlying said defects.

2. A fuel cell according to claim 1 wherein said protective coating comprises Cr/Ni/Mo-rich stainless steel.

3. In a bipolar PEM fuel cell having a plurality of cells each comprising an anode, a cathode, a membrane electrolyte interjacent said anode and cathode for conducting ions therebetween, and a plurality of electrically conductive contact elements engaging said anodes and cathodes for conducting electrical current therefrom, the improvement comprising said contact elements each comprising a metal core selected from the group consisting of aluminum and titanium, a stainless steel protective coating on said core, and a titanium nitride topcoat atop said stainless steel protective coating, a plurality of defects in said topcoat exposing said protective coating to a corrosive operating environment within said fuel cell, said stainless steel coating containing sufficient chromium, nickel and molybdenum as to be susceptible to oxidative passivation by said corrosive operating environment so as to form a barrier to further oxidation/corrosion on the portions of such coating as are exposed to said environment, whereby said core is protected from corroding by said stainless steel underlying said defects.

4. The fuel cell according to claim 3 wherein at least one of said contact elements is a septum engaging the anode of one said cell and the cathode of the next adjacent cell while separating said adjacent cells from each other.

5. The bipolar fuel cell according to claim 1 wherein said stainless steel comprises by weight at least 16% Cr, at least 20% Ni, and at least 3% Mo.

6. The fuel cell according to claim 1 wherein said titanium nitride is sputtered onto said protective coating at a bias of at least about 60 V.

7. The fuel cell according to claim 2 wherein said stainless steel is sputtered onto said core at a bias of at least about 270 V.

8. The fuel cell according to claim 1 wherein said protective coating comprises electrolessly deposited nickel-phosphorous alloys.

* * * * *